United States Patent Office 3,493,971
Patented Feb. 3, 1970

3,493,971
OMEGA SYSTEM COMPENSATING FOR VARIA-
TIONS OF THE TRANSMISSION MEDIUM
Charles William Earp, London, England, assignor to
International Standard Corporation, New York,
N.Y., a corporation of Delaware
Filed Jan. 30, 1968, Ser. No. 701,610
Claims priority, application Great Britain, Feb. 3, 1967,
5,311/67; Apr. 6, 1967, 15,796/67
Int. Cl. G01s 1/30
U.S. Cl. 343—105
4 Claims

ABSTRACT OF THE DISCLOSURE

A receiver for a radio navigation system of the Omega type wherein at least three different frequencies are transmitted from two or more stations in a time-sharing sequence. At the receiver digital differential phase measurements are made between like frequencies and correction factors are derived from these measurements using scalers whose ratio of scaling is related to the ratio of the frequencies involved and using subtractors for comparing the different measurements. Thereby correction factors are derived which are combined, in an adder, to at least partially correct for variations of transmission path lengths over a long or short term, local or world-wide, diurnal or seasonal.

---

This invention relates to radio navigation systems, and particularly to a receiver for an improved "OMEGA" navigation system.

In a known type of hyperbolic radio navigation system a mobile receiver station determines its position with respect to two fixed transmitter stations by measuring the differential phase at the receiver between two radio waves of fixed phase difference transmitted from respective ones of the two fixed stations. Moreover, measuring the phase difference between the two radio waves is equivalent to measuring the differential transit time of the two waves between the transmitter stations and the receiver station. The differential phase or differential transit time measurement represents a measurement of the differential distance of the receiver from the two transmitter stations.

Where the range of a radio navigation system of the above type is sufficiently great for the transmission paths from the two transmitters to the receiver to be partly in light and partly in darkness, the differential distance of the receiver from the two transmitters is made up of two components, one of which is wholly in daylight whilst the other is wholly in darkness. These components may be termed specifically the "differential daylight path" and the "differential night path," respectively, although these are particular examples only of a more general phenomenon, to be discussed more fully hereafter.

Except in the case where a line-of-sight transmission path is used, or one of the above components is zero, errors tend to arise in either the differential phase or differential transit time measurement because the phase velocity (and hence the wavelength) of the radio waves is not the same over the differential daylight path as over the differential night path. The errors are very noticeable at very low frequencies of the order of tens of kilocycles, utilising a ground-wave transmission path between the transmitters and the receiver station, and an object of the present invention is to reduce or compensate for such errors particularly, but not necessarily only, in very low frequency hyperbolic radio navigation systems.

Also, as indicated above, the differential daylight path and differential night path errors are special cases only of a more general phenomenon involving the equivalent heights of the ionospheric boundary or upper wall of what may be regarded as a wave-guide in space through which transmission takes place. Variations in layer height cause variations in phase velocity of radio waves transmitted through the medium, and compensation, preferably automatic in application, is desirable for signal paths corresponding to all variations of layer height, whether long-term or short-term, localised or world-wide, seasonal or diurnal.

According to a first aspect of the invention, there is provided a radio navigation system for determining differential distance of a mobile craft from each of two spaced-apart fixed stations comprised in said system by measuring the differential phase engendered between a pair of radio waves of the same frequency and fixed initial phase difference transmitted between the fixed stations and the mobile craft, each wave to one or other path therebetween, and converting the measurement to differential distance between the respective paths by use of the known phase velocity of said waves in the intervening transmission medium, the determination so made being subject to incidental error arising from incidental variations from the normal of the phase velocity of said waves in the medium owing to natural variations occurring from time to time in the transmission properties of the medium: wherein means are provided in receiving equipment forming part of said system to obtain from received pairs of radio waves on at least two distinct frequencies transmitted in a time-sharing sequence over the medium respective signals representing the required differential distance in terms of the wavelength under a given propagation condition of the medium for a wave directly related to one of said pairs of waves, and means to obtain from the respective signals a further signal representing the incidental error in terms of the difference between the respective signals.

According to a second aspect of the invention, there is provided a radio navigation system for determining differential distance of a mobile craft from each of two spaced-apart fixed stations comprised in said system by measuring the differential phase engendered between a pair of radio waves of the same frequency and fixed initial phase difference transmitted between the fixed stations and the mobile craft, each wave to one or other path therebetween, and converting the measurement to differential distance between the respective paths by use of the known phase velocity of said waves in the intervening transmission medium, the determination so made being subject to incidental error arising from incidental variations from the normal of the phase velocity of said waves in the medium owing to natural variations occurring from time to time in the transmission properties of the medium: wherein there is provided in receiving equipment forming part of said system means to receive pairs of radio waves on at least three distinct frequencies transmitted in a time-sharing sequence over the medium; means to obtain from each pair of waves at each frequency signals representing the differential distance in terms of the wavelength under a given propagation condition of the medium for one of said pairs of waves; comparison circuits to compare the differential phase signal of said one pair of waves with that of each of the other pairs of waves, and to derive correction signals therefrom indicative of transmission path variation from the normal; and correction circuits arranged to correct, at least partially, the differential phase signal of said one pair of waves to a value consistent with the normal value for the medium.

According to a third aspect of the invention, there is provided a radio navigation system for determining differential distance of a mobile craft from each of two spaced-apart fixed stations comprised in said system by measuring the differential phase engendered between a pair of radio waves of the same frequency and fixed initial phase difference transmitted between the fixed stations and the mobile craft, each wave to one or other path therebetween, and converting the measurement to differential distance between the respective paths by use of the known phase velocity of said waves in the intervening transmission medium, the determination made being subject to incidental error arising from incidental variations from the normal of the phase velocity of said waves in the medium owing to natural variations occurring from time to time in the transmission properties of the medium: wherein there is provided in receiving equipment forming part of said system means to receive pairs of radio waves on a plurality of distinct frequencies transmitted in a time sharing sequence over the medium; means to obtain from received first and second pairs of said waves a first signal having a magnitude proportional to the differential distance between the mobile station and the two fixed stations in terms of the wavelength under a given propagation condition of the medium of a wave at a first frequency; means to obtain from received second and third pairs of said waves a second signal having a magnitude proportional to the differential distance between the mobile station and the two fixed stations in terms of the wavelength under the given propagation condition of the medium of a wave at a second frequency; a first multiplier to multiply the second signal by the ratio between the respective wavelengths under the given propagation condition of said first and second frequencies; a difference circuit to measure the difference between the respective magnitudes of the multiplied second and the first signal; a second multiplier to multiply the output signal of the difference circuit by a factor such that the multiplied difference signal represents the component of the differential distance in terms of the units of either the first signal or the second signal under an alternative propagation condition of the medium; and a combiner circuit wherein the multiplied difference signal is combined with the first (or second) signal to yield a differential distance signal compensated for alternative propagation condition error.

Further according to the invention, there is provided a radio navigation system including means at a station to receive a first pair of radio waves at a first frequency transmitted respectively from spaced first and second transmitters; means at said station to receive a second pair of radio waves at a second frequency transmitted respectively from said two transmitters; means at said station to obtain from the received first and second pairs of radio waves respective signals representing the differential distance of said station from the two transmitters in terms of the wavelength under a given diurnal condition (i.e. total light or total darkness throughout the differential transmission path) of the first pair of radio waves; and means to obtain from the respective measurements a signal representing the difference between the respective signals.

In each of the above statements, the "normal of the phase velocity" is the velocity at an arbitrary value of wave-guide height of 77.5 km., and expected variations from this value corresponding to other layer heights may be derived from information given in a paper by J. R. Wait and K. Spies (1964): "Characteristics of the earth-ionosphere wave-guide for VLF Systems"—Nat. Bur. Stds. Tech. Note No. 300.

Further, no limitation is intended in these statements as to the location of the transmitters and the receiver: normally, the transmitters will be located in the fixed (ground) stations, and the receiver in the mobile craft (ship, aircraft or other mobile vehicle); but equally, the mobile craft may contain the transmitters, and each fixed station may contain a receiver; or again, the craft may act simply as a reflector of radio waves transmitted from the ground stations and received back by them after reflection.

A system, moreover, may comprise a plurality of ground stations so as to give world-wide coverage, but, in general, only two stations are involved at a time in a single determination of position (or relative position) of the mobile craft. Such a system is the Omega radio navigation system, in which ground transmitters with a wide geographical spacing each radiate two pairs of waves at frequencies $f_1$ and $f_2$ respectively, on a time-sharing basis. In addition each station radiates a wave at a frequency $f_3$ for ambiguity resolution purposes. A description of the Omega system is to be found on p. 139 and pp. 142 to 144 of "Radio Navigation Systems" (Pergamon Press; edited by W. Bauss).

The invention will now be more particularly described with reference to the accompanying drawings illustrating in block schematic form a number of embodiments based on the use of two, or of three, frequencies for determining differential distance of a moving craft from fixed ground stations, and the corrections needed for coping with changing propagation conditions of the transmission medium. In the drawings, FIG. 1 shows receiving apparatus of a mobile station in a three-frequency system based on straight comparisons of the received frequencies, while FIG. 2 shows a modification of the apparatus of FIG. 1 to give an improved result;

The embodiments of the present invention are aimed primarily at providing automatic compensation within a mobile station receiver apparatus for the diurnal variations of phase velocity of the ground transmissions without "a priori" knowledge of the amount of the transmission path in darkness, although in other applications of the invention a mere indication of the differential night path, without automatic compensation may suffice.

However, the application of the invention to the more general problem of substantially exact compensation for a range of wave-guide heights will first be discussed with reference to the embodiment illustrated in FIG. 1.

Figure 1:
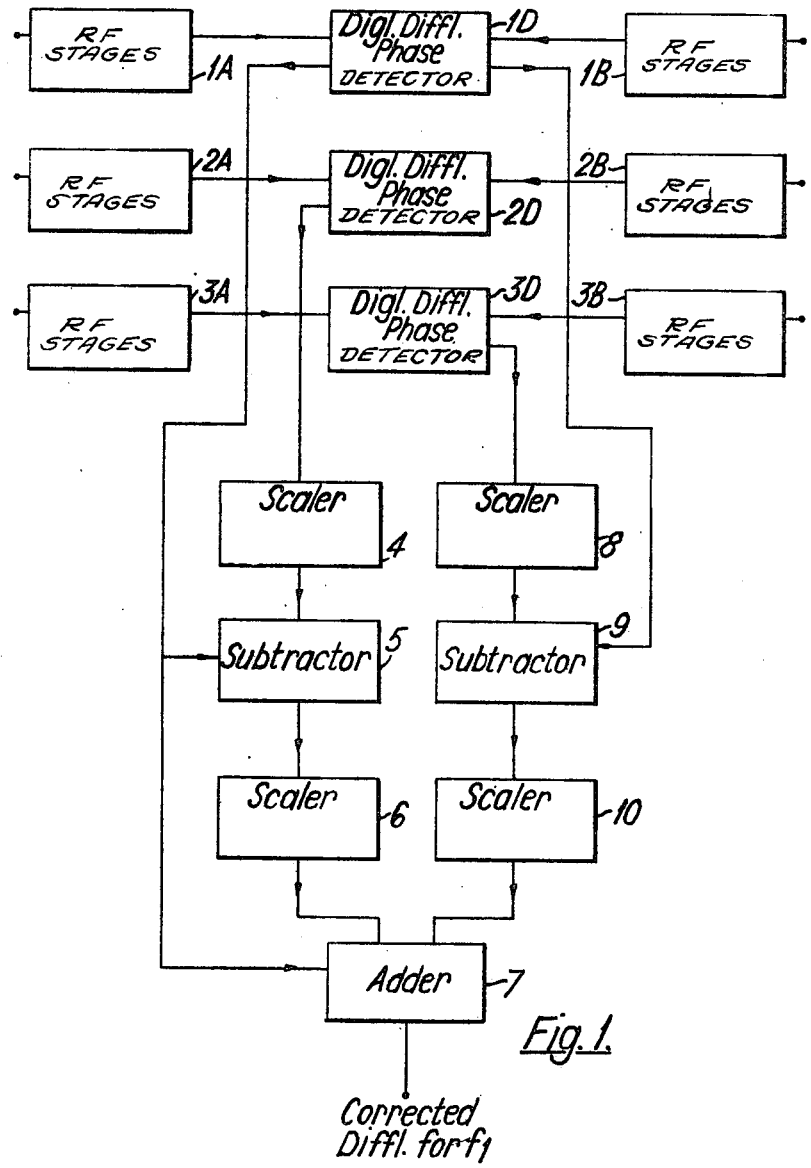

FIG. 1 shows a receiving apparatus for a three-frequency navigation system in which the blocks 1A, 2A, 3A, 1B, 2B and 3B represent individual R.F. stages for receiving two groups of three frequencies of the same frequency values for each group, transmitted by two fixed spaced-apart ground transmitters A and B, not shown. Each station transmits the three frequencies $f_1$, $f_2$, $f_3$, on a time-sharing basis, and each pair of frequencies of the same value, e.g., $f_1$, is linked by a predetermined and fixed initial phase difference, which may be zero.

The six outputs from the R.F. stages, two of each frequency, are fed to respective inputs of three digital differential phase detectors 1D, 2D, 3D for the three pairs of frequencies, which compare the phases existing between the respective received signals at each frequency. The differential phase detector 1D is arranged to read zero for frequency $f_1$ when the receiver is equidistant from transmitters A and B, giving a positive digital count according to displacement nearer to A, and a negative count for displacement nearer to B.

Now this count of phase difference exactly represents differential distance from A and B according to well-defined units of distance defined by the wavelength of frequency $f_1$. So long as the phase velocity along the paths from A and B is known and constant, as, for example, when both paths are completely in daylight, the differential distance reading can have no error.

In the same manner, a digital count of phase difference between the two waves of frequency $f_2$ in differential phase detector 2D, and of frequency $f_3$ in differential phase detector 3D, defines differential distance according to new units of distance which are related to the $f_1$ units approximately in the ratio $f_1/f_2$ and $f_1/f_3$ respectively. In practice, the units on the respective counts will not be exactly in these ratios, for the phase velocities of the waves $f_1$, $f_2$ and $f_3$ will differ slightly, but each velocity is known. If these digital phase measurements at $f_2$ and $f_3$ are therefore scaled by the inverse ratios of the daylight wavelengths of the respective pairs of frequencies, the modified digital readings at $f_2$ and $f_3$ will exactly match the digital readings from $f_1$, so long as both radio paths are completely in daylight: that is, the respective differences of the difference counts will remain at zero while the paths are wholly in daylight (or, more generally, in a "given propagation condition").

If, now part of the radio path from A, or B, or from both, is in darkness—the "alternative propagation condition"—the phase velocities of all the waves will change to new values, and the zero difference counts will assume finite values representative of the differential amount of path which is in darkness. The scale of distance units from the individual differential distance counts (from 1D etc.) is completely defined by the revised phase velocities of $f_1$, $f_2$ and $f_3$.

To revert now to the embodiment to illustrate the application of these principles, and before embarking on a detailed numerical examination of the manner, the output of digital phase detector 1D is connected to a first input of each of two subtractors 5 and 9, and also to the first input of an adder 7. (The separated outputs shown on 1D are identical, being shown separated merely for convenience.) The outputs from digital phase detector 2D and 3D are connected to respective scalers 4 and 8, having scaling factors $\lambda_2/\lambda_1$ and $\lambda_3/\lambda_1$, respectively, (where $\lambda_1$, $\lambda_2$ and $\lambda_3$ are the wavelengths respectively of $f_1$, $f_2$ and $f_3$), and the outputs of these scalers are applied as second outputs to the subtractors 5 and 9, respectively. The outputs from 5 and 9 are each connected via respective scalers 6 and 10, having multiplication factors to be discussed hereafter, to second and third inputs of the adder 7. The output signal from 7 is proportional to corrected differential time or phase of the incoming waves from which distance may be derived.

The operation of the method of correction may be illustrated by considering how to apply exact compensation for three specific wave-guide heights $h_0$, $h_1$ and $h_2$.

Let the waveguide height be $h_0$, when the frequencies $f_1$, $f_2$ and $f_3$ have wavelengths $\lambda_1$, $\lambda_2$, $\lambda_3$.

Making a differential phase measurement at frequency $f_1$, if the differential distance is D, then when wave-guide height is $h_0$, the result is $360D/\lambda_1$ degrees.

For wave-guide heights of $h_1$ and $h_2$ the measurement will yield $$\frac{360D}{\lambda_1}+\theta_1, \text{ and } \frac{360D}{\lambda_1}+\theta_2$$

respectively, where $\theta_1$ and $\theta_2$ may be regarded as errors (in degrees) from the value at $h_0$ for the frequency $f_1$.

Differential phase measurement at frequency $f_2$ gives similarly:

$$\frac{360D}{\lambda_2}, \frac{360D}{\lambda_2}+\varphi_1, \text{ and } \frac{360D}{\lambda_2}+\varphi_2$$

where $\varphi_1$ $\varphi_2$ are the corresponding errors at $h_1$ and $h_2$ for $f_2$.

Measurement at $f_3$ gives:

$$\frac{360D}{\lambda_3}, \frac{360D}{\lambda_3}+\psi_1, \frac{360D}{\lambda_3}+\psi_2$$

where $\psi_1$ and $\psi_2$ are the corresponding errors at $h_1$ and $h_2$ for $f_3$. Putting in scale factors of $\lambda_2/\lambda_1$ and $\lambda_3/\lambda_1$ in order to bring measurements at the three frequencies to the same scale of distance rather than phase, Table A may be constructed.

TABLE A

| Wave-guide height | $h_0$ | $h_1$ | $h_2$ | |
|---|---|---|---|---|
| $f_1$ | $360 D/\lambda_1$ | $\frac{360\ D}{\lambda_1}+\theta_1$ | $\frac{360\ D}{\lambda_1}+\theta_2$ | A |
| $f_2$ | $360 D/\lambda_1$ | $\frac{360\ D}{\lambda_1}\cdot\frac{\lambda_2}{\lambda_1}+\varphi_1\lambda_1$ | $\frac{360\ D}{\lambda_1}\cdot\frac{\lambda_2}{\lambda_1}+\varphi_2\lambda_1$ | B |
| $f_3$ | $360 D/\lambda_1$ | $\frac{360\ D}{\lambda_1}\cdot\frac{\lambda_3}{\lambda_1}+\psi_1\lambda_1$ | $\frac{360\ D}{\lambda_1}\cdot\frac{\lambda_3}{\lambda_1}+\psi_2\lambda_1$ | C |
| A-B | 0 | $\theta_1-\varphi_1\frac{\lambda_2}{\lambda_1}$ | $\theta_2-\varphi_2\frac{\lambda_2}{\lambda_1}$ | D |
| A-C | 0 | $\theta_1-\psi_1\frac{\lambda_3}{\lambda_1}$ | $\theta_2-\psi_2\frac{\lambda_3}{\lambda_1}$ | E |

The multiplication factors $x$ and $y$ of scalers 6 and 10 are now chosen so that $$\left(\theta_1-\varphi_1\cdot\frac{\lambda_2}{\lambda_1}\right)x+\left(\theta_1-\psi_1\cdot\frac{\lambda_3}{\lambda_1}\right)y=-\theta_1$$

$$\left(\theta_2-\varphi_2\cdot\frac{\lambda_2}{\lambda_1}\right)x+\left(\theta_2-\psi_2\cdot\frac{\lambda_3}{\lambda_1}\right)y=-\theta_2$$

Thus $$A+Dx+Ey=\frac{360D}{\lambda_1}$$

Where A, D and E on the left-hand side are row-identification letters of Table A for $h_0$, $h_1$ and $h_2$, taken in turn.

Table B has been constructed using practical values in order to show how compensation can be effected for a range of reflecting layer heights between 70 and 90 km., based on 77.5 km. as standard.

TABLE B

| Operation | Wave-guide height (km.) | 70 | 72.5 | 75 | 77.5 (STD) | 80 | 90 | Fig. 1 BLK |
|---|---|---|---|---|---|---|---|---|
| 1 | Measure 360 D/$\lambda_1$ at 10 kHz. Error in deg./1,000 km. or $\mu$sec./3,600 km. | 22.4 | 14.9 | 7.5 | 0 | −7.8 | −35.3 | 1D |
| 2 | Measure 360 D/$\lambda_2$ at 11 kHz. Error in deg./1,000 km. | 21 | 14.1 | 7.2 | 0 | −7.2 | −34.2 | 2D |
| 3 | Multiply by $\lambda_2/\lambda_1$ Error in $\mu$sec./3,600 km. | 19.1 | 12.8 | 6.55 | 0 | −6.55 | −31.1 | 4 |
| 4 | Measure 360 D/$\lambda_3$ at 14 kHz. Error in deg./1,000 km. | 19.3 | 13.0 | 6.7 | 0 | −6.5 | −35.7 | 3D |
| 5 | Multiply by $\lambda_3/\lambda_1$ Error in $\mu$sec./3,600 km. | 13.76 | 9.16 | 4.80 | 0 | −4.63 | −25.5 | 8 |
| 6 | (A) Differential Time error 10/11 kHz. ((1)−(3)). | 3.3 | 2.1 | 0.95 | 0 | −1.25 | −4.2 | 5 |
| 7 | (B) Differential Time error 10/14 kHz. ((1)−(5)). | 8.64 | 5.74 | 2.70 | 0 | −3.17 | −9.8 | 9 |
| 8 | 15.95 A | 52.7 | 33.5 | 15.15 | 0 | −19.94 | −67.0 | 6 |
| 9 | 3.27 B | 28.25 | 18.77 | 8.83 | 0 | −10.37 | −32.05 | 10 |
| 10 | 15.95A−3.27B | 24.45 | 14.78 | 6.32 | 0 | −9.57 | −34.95 | 7 |
| 11 | Residual Error, $\mu$sec./3,600 km. ((1)−(10)). | −2.05 | −0.12 | +1.18 | 0 | +1.77 | −0.35 | O/P |

Operation line 1 in the table shows measurements of differential phase at 10 kHz. yielding values of $360D/\lambda_1$, where $\lambda_1$ is the known wavelength when layer height is 77.5 km. As wavelength varies with layer height, only the 77.5 km. column has zero error. The expected errors corresponding to other layer heights have been derived from information given in the cited paper by J. R. Wait and K. Spies (1964) "Characteristics of the earth-ionosphere wave-guide for VLF Systems"—NBS Technical Note No. 300.

The figures given correspond to expected phase shift in degrees per 1000 km. of path, on change of wave-guide height from 77.5 km.

In operation lines 2 and 4, figures are given for measurements at 11 kHz. and 14 kHz. In lines 3 and 5, these figures are translated to the same time scale as for line 1, by applying the scaling factors $\lambda_2/\lambda_1$ and $\lambda_3/\lambda_1$, respectively.

These factors are approximately 10/11 and 10/14, in the inverse ratios of the corresponding frequency ratios, but not exactly so, as the phase velocities of the waves (for a layer height of 77.5 km.) are all slightly different. To account for reduced phase velocity with frequency, these factors have been reduced by 0.1% and 0.3%.

It is now possible to write down the lines 6 and 7 for (A) and (B) respectively, giving differential timing errors which can, of course, be measured by practical apparatus.

Considering now the errors to be expected for two specific layer heights, namely 72.5 km. and 90 km., values of $x$ and $y$ may be chosen such that:

$2.1x + 5.62y = 14.9$ (for 72.5 km.)
$4.2x + 9.8y = 35.3$ (for 90 km.)

whence $x = 15.95$, $y = -3.27$, and these are the respective multipliers for scalers 6 and 10 (ignoring the negative sign).

Thus, $15.95A - 3.27B$ = expected error for measurements at 10 kHz., for the three layer heights 72.5, 77.5 and 90 km. After compensation residual expected error is very small for all layer heights, as the final line of the table shows, in comparison with the errors in line 1. (The small residual errors for columns 72.5 and 90 are incidental calculation errors).

By a similar process it is possible to derive compensation values for the measurements at 11 kHz. and 14 kHz., or for a beat frequency between any pair of the transmitted waves.

It is evident that by the use of $n$ frequencies, compensation could be applied for $n$ different layer heights, in which case compensation would be more precise than for the 3-frequency system.

Figure 2:
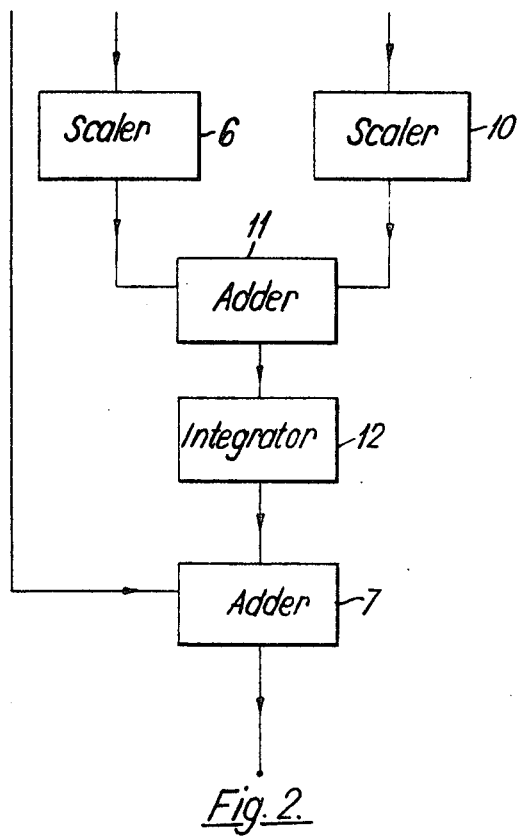

The use of a multiplying factor as high as 15.95 will involve the amplification of any random errors which result from unpredictable variation of layer height. In a modification of the invention shown in FIG. 2 time smoothing is applied to the correction factor to reduce the random errors. As the correction is a small part of the whole differential time to be measured, and as the true correction value cannot change rapidly, time averaging is performed before the application of the correction, hence suppressing the effect of short-time random variations. As shown in FIG. 2 an additional adder circuit 11 is connected to the outputs of scalers 6 and 10 in place of adder circuit 7. An integrating circuit 12 is connected to the output of adder circuit 11 and its output is connected to an input of adder 7 instead of the outputs of scalers 6 and 10, as in the previous embodiment.

In this embodiment frequencies 10, 11 and 14 kHz. are used for frequencies $f_1$, $f_2$ and $f_3$ but the time smoothing feature is applicable to any group of frequencies.

Figure 3:
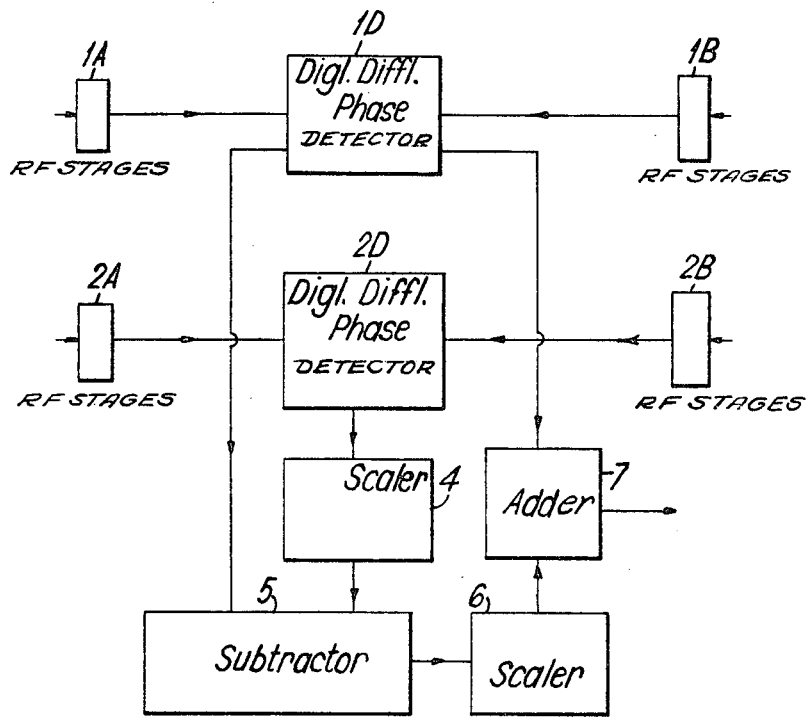
FIG. 3 shows receiving apparatus for a two-frequency system, analogous to the three-frequency system and apparatus of FIG. 1.

The range of layer heights above-discussed will cover in general a wide-range of conditions, as mentioned, but if only diurnal conditions are to be provided for, that is to say, compensation for differences between day and night paths only in the short term, then a two-frequency system may suffice. Such a system is shown in FIG. 3, which is a simplified version of FIG. 1. Here the same references are used as in FIG. 1, after eliminating the blocks appropriate to frequency $f_3$.

In the above-described two frequency embodiment of FIG. 3, it may be that if the path from one ground station is in darkness, the change of the phase velocities on frequencies $f_1$ and $f_2$ may involve significant transit-time error on each frequency, yet possibly a rather small differential timing error. If the choice of $f_1$ and $f_2$ is such that this is the case, then the difference count of differential night error derived from subtractor 5 may represent only a small fraction of individual errors on the $f_1$ and $f_2$ phase counters. This being so, the night-error scaler may involve the use of a large multiplying factor, and instrumental accuracy could suffer unless all the phase velocities were known with great precision. A further embodiment of the two frequency receiver aims to reduce this possible source of inaccuracy, and this embodiment is described with reference to FIG. 4.

Figure 4:
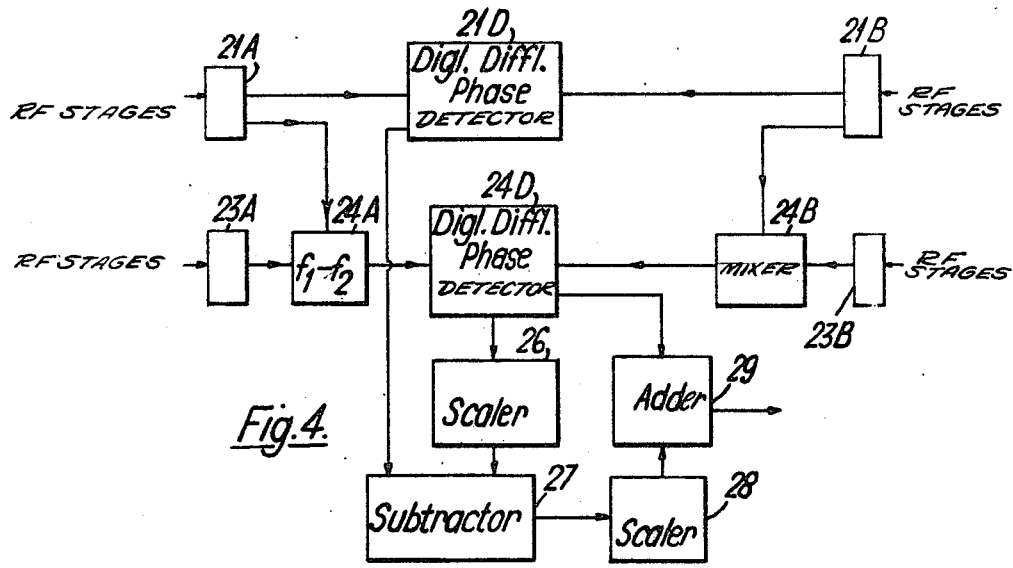
FIG. 4 shows a modification of the two-frequency apparatus of FIG. 3 to give improved accuracy.

In FIG. 4 the required differential distance is measured in terms of wavelength of the $f_1-f_2$ beat during daylight propagation. Hence the $f_1-f_2$ beats are extracted, and a digital phase measurement is made to yield an accurate result when no part of either path is in darkness.

A digital count of phase difference between the two $f_1$ waves is also made, and this value is divided by the ratio of wavelengths of the $f_1-f_2$ beat and the $f_1$ signal, which is approximately (but not exactly) equal to $$\frac{f_1}{f_1-f_2}$$

Waves at frequency $f_1$ received by R.F. stages 21A and 21B are fed to a digital differential phase detector 21D. Waves at frequency $f_2$ received by R.F. stages 22A and 22B are mixed in respective mixers 24A and 24B with waves R.F. stages 21A and 21B to produce two beat frequency waves at $f_1-f_2$ which are fed to a digital differential phase detector 24D.

The digital count of the phase difference between the two waves at $f_1-f_2$ is multiplied in scaler 26, by the ratio of the daytime wavelengths of the $f_1$ and the $f_1-f_2$ beat, which is approximately (but not exactly) equal to $$\frac{f_1-f_2}{f_1}$$

This multiplication is, of course, equivalent to dividing the digital count by a factor which is approximately (but not exactly) equal to $$\frac{f_1}{f_1-f_2}$$

The outputs of the digital differential phase detector 21D and the multiplier 26 are fed to a subtractor 27. Since the $f_1$ digital differential phase reading is the same as the multiplied $f_1-f_2$ digital differential phase reading, if neither transmission path is in darkness, the difference counter 27 reads zero. When darkness appears over one transmission path this difference counter gives an output representative of the amount of the transmission path in darkness.

A second scaler 28, multiplies the output of the difference counter 27 by a factor which converts it to the same scale of units as that defined by the differential phase measurement at $f_1-f_2$ to yield a differential distance error on the same distance scale as that given by the differential digital phase measurement at $f_1-f_2$. This is added to the output of the digital phase detector 24D in an adder 29 to give an output compensated for night effect.

Now it is known that the diurnal timing variation of a beat frequency is in general smaller than that of an original radio frequency. (In fact, it has been shown that, by the choice of two radio frequencies, one of which is unfortunately outside the Omega spectrum, the diurnal effect on the beat frequency can be reduced to zero. However, on the $f_1-f_2$ channel there is a smaller timing error to be compensated, and the larger differential timing error of the $f_1$ and $f_1-f_2$ systems yields a larger effective reading on the difference count of night error. Hence the effective multiplying factor of the night error "scaler" is reduced.

Finally, a further three-frequency embodiment based exclusively on the use of beat frequencies will be described with reference to FIG. 5.

Figure 5:
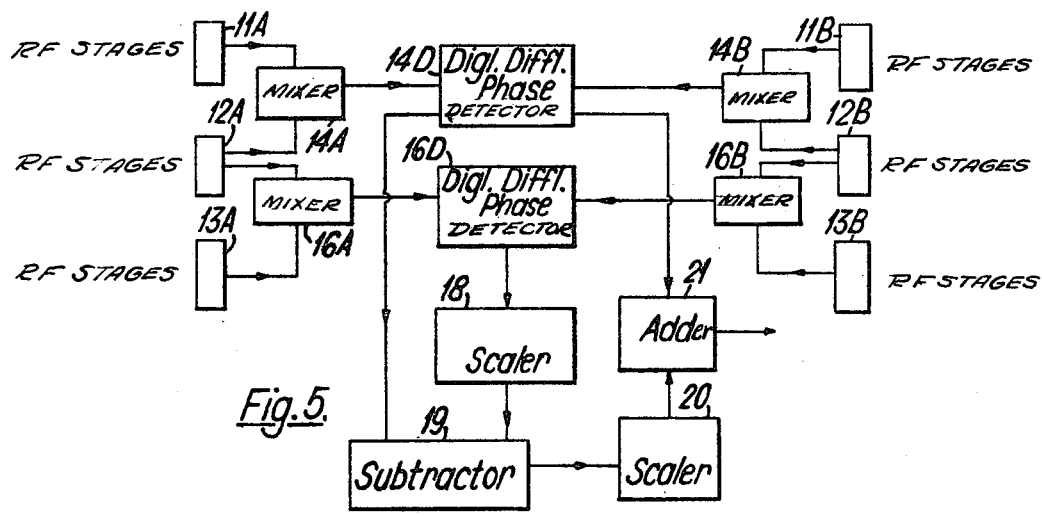
FIG. 5 shows receiving apparatus for another three-frequency system based exclusively on the use of beat frequencies between the received frequencies.

In FIG. 5 frequencies $f_1$, $f_2$ and $f_3$ are assumed to be extracted in R.F. stages 11A, 12A and 13A respectively, from the waves received from station A of two ground stations A and B. The corresponding waves from station B are extracted in R.F. stages 11B, 12B and 13B.

The waves from the stages 11A, 12A and 11B, 12B are mixed in respective mixers 14A and 14B to produce two beat waves having a frequency $f_1-f_2$, and digital differential phase measurement of the two beats at $f_1-f_2$ is made in the device 14D.

The waves from the stages 12A, 13A and 12B, 13B are mixed in respective mixers 16A and 16B to produce two beat waves having a frequency $f_2-f_3$, and digital differential phase measurement of the two beats is made in the device 16D.

The digital differential phase measurement of the two beats $f_1-f_2$ yields, during daytime, an accurate digital reading of the differential distance of the mobile station from the ground stations A and B, on a scale of distance units defined by the equivalent wavelength of the beat $f_1-f_2$.

Similar digital differential phase measurement of the $f_2-f_3$ beats also yields, during daytime, an accurate digital reading of differential distance from stations A and B according to a new distance scale defined by the equivalent wavelength of the $f_2-f_3$ beat.

A scaler 18, multiplies the latter digital reading by the ratio of equivalent wavelengths of the two beats to yield, during totality of daylight, a reading identical to the digital reading from the $f_1-f_2$ measurement, thus yielding a zero differential count in subtractor 19.

Under conditions of darkness over any part of the radio paths, phase velocities of the waves are changed to new fixed values, whereby effective wavelengths of the beats $f_1-f_2$ and $f_2-f_3$ are changed over the dark portions of their paths, and the otherwise identical digital counts become different. The difference between the two counts, measured in the subtractor 19, provides according to a new distance scale defined by the different phase velocities of $f_1-f_2$ and $f_2-f_3$ over the dark portions of the radio path, a measurement directly proportional to the differential lengths of the paths in darkness.

A scaler 20, now converts this error signal to the differential distance error caused by the dark path, on the same distance scale as the original scale given by digital phase measurement at $f_1-f_2$. Thus, adding the two digital readings in an adder 21 yields the exact value of differential distance to the two ground stations, completely compensated for night effect.

Although all the above-described embodiments of the invention are intended for use in the Omega radio navigation system, the invention is not limited in its application to this system.

In order for this invention to be put into operation it is necessary to know the respective seasonal, or night and daytime, phase velocities of the radio waves at each of the transmitted frequencies. This information is already available so far as frequencies in the frequency band utilised by the Omega system are concerned, and could be determined—if not already available—for other frequency bands. The daytime and night wavelengths of a beat between two of the received frequencies can also be determined from a knowledge of the respective phase velocities of the received frequencies.

In the existing Omega system known correction factors can be applied to the differential distance measurement to eliminate or reduce the error produced when both transmission paths are in darkness. As previously mentioned, however, such correction factors are of little use when different proportions of the respective paths are in darkness; the present invention not only reduces errors produced when different proportions of the respective paths are in darkness, but also automatically applies the necessary correction factor under the total darkness condition.

I claim:

1. A receiver for a radio navigation system having at least two spaced transmitters radiating signals into a variable medium comprising:
    means for deriving from said radiated signals a first pair of radio waves at a first frequency;
    means for deriving from said radiated signals a second pair of radio waves at a second frequency;
    first means to obtain from the derived first and second pairs of radio waves first and second signals respectively representing the differential distance of said receiver from two of said spaced transmitters in terms of their respective frequencies;
    digital scaling means for converting said second signal representing said differential difference to the same terms as said first signal representing said differential distance;
    a subtractor for determining the digital difference between said first signal and said converted second signal;
    means for scaling said digital difference; and
    a digital adder coupled to said first means and said means for scaling to modify said first signal.

2. A receiver according to claim 1, wherein said first means comprises:
    a digital differential phase detector for each pair of waves at the same frequency value for determining said first and second signals representing differential distance at each frequency.

3. A receiver according to claim 1, wherein said means for scaling said digital difference includes multiplying circuits to derive correction signals therefrom indicative of variations of said variable medium.

4. A receiver according to claim 1, further including:
    means for deriving from said radiated signals a third pair of radio waves at a third frequency;
    second means to obtain from said third pair of radio waves a third signal representing the differential distance of said receiver from said two of said transmitters in terms of said third frequency;
    digital scaling means for converting said third signal representing said differential difference to the same terms as said first signal representing said differential distance;
    a second subtractor for determining the digital difference of said first signal and said converted third signal; and
    means for scaling the digital difference of said first signal and said converted third signal coupled to said digital adder to further modify said first signal, thereby providing a differential distance signal which is compensated for errors due to said variable medium.

References Cited

UNITED STATES PATENTS

| 2,805,398 | 9/1957 | Albersheim | 325—65 |
| 3,161,880 | 12/1964 | Swanson | 343—105 |
| 3,209,356 | 2/1965 | Smith | 343—105 |

RODNEY D. BENNETT, JR., Primary Examiner

H. C. WAMSLEY, Assistant Examiner

U.S. Cl. X.R.

325—52, 65